United States Patent [19]

Cassone et al.

[11] 4,301,760
[45] Nov. 24, 1981

[54] METHOD FOR POSITIONING A WATERCRAFT, IN PARTICULAR A DRILLING SHIP AS WELL AS RELEVANT DEVICES

[75] Inventors: Giorgio Cassone; Franco Scolari, both of San Donato Milanese, Italy

[73] Assignee: Saipem S.p.A., Milanese, Italy

[21] Appl. No.: 58,948

[22] Filed: Jul. 19, 1979

Related U.S. Application Data

[63] Continuation of Ser. No. 715,057, Aug. 17, 1976, abandoned, which is a continuation of Ser. No. 542,711, Jan. 21, 1975, abandoned.

[30] Foreign Application Priority Data

Jan. 21, 1974 [IT] Italy .................. 19608 A/74

[51] Int. Cl.³ .......................................... B63H 25/42
[52] U.S. Cl. .............................. 114/144 B; 166/354
[58] Field of Search ............ 114/144 B, 293; 175/5, 175/6; 166/353–355

[56] References Cited

U.S. PATENT DOCUMENTS

| | | | |
|---|---|---|---|
| 3,140,688 | 7/1964 | Shatto, Jr. .................. | 114/144 B |
| 3,191,201 | 6/1965 | Richardson et al. ............ | 114/144 B |
| 3,318,275 | 5/1967 | Field .................................. | 114/265 |
| 3,407,773 | 10/1968 | Baxter .............................. | 114/144 B |
| 3,508,512 | 4/1970 | Desrayaud et al. ............ | 114/144 B |
| 3,588,796 | 6/1971 | Armistead et al. .............. | 114/144 B |

*Primary Examiner*—Sherman D. Basinger
*Attorney, Agent, or Firm*—Morgan, Finnegan, Pine, Foley & Lee

[57] ABSTRACT

A drilling ship is maintained over a deep sea well in a drilling position defined by an inner circle and an outer circle having the well as their center. The ship is connected to a set of anchors fastened to the sea bed and adapted, when the ship is subjected to the action of external forces tending to change its position and of not more than a predetermined magnitude, to restrain the ship from moving beyond the confines of the inner circle. The ship is equipped with a set of adjustable propellers adapted, in conjunction with the anchors, to position the ship within the confines of the outer circle when the external forces acting on the ship to change its position exceed the predetermined magnitude. The operation of the propellers is controlled by a computer to which values are fed which are determined by detectors of the position of the ship and of external forces acting upon it.

8 Claims, 4 Drawing Figures

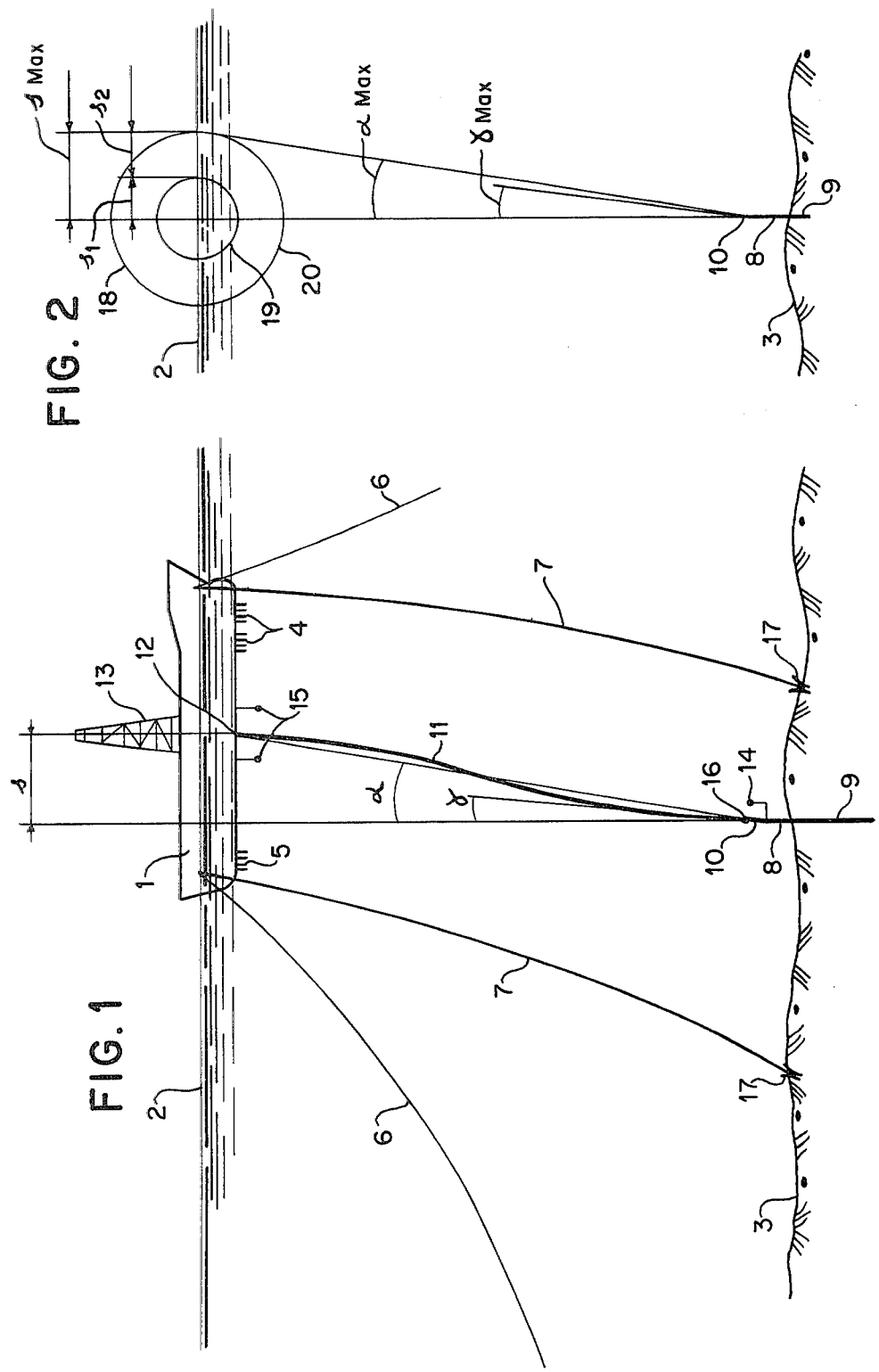

METHOD FOR POSITIONING A WATERCRAFT, IN PARTICULAR A DRILLING SHIP AS WELL AS RELEVANT DEVICES

This is a continuation of application Ser. No. 715,057 filed Aug. 17, 1976 which is a continuation of application Ser. No. 542,711 filed Jan. 21, 1975, both abandoned.

The present invention relates to a method and relevant devices for positioning a watercraft, in particular a drilling ship.

It is known that offshore drilling may be carried out by making use of means that are kept in a position which is fixed with respect to the sea bottom, such as: fixed drilling platforms, watercrafts anchored to the sea bottom or watercrafts positioned by propellers.

Said means present several drawbacks in use, since the use of fixed platforms is limited to shallow waters, the use of an anchored watercraft is limited by comparatively favourable sea and atmospheric conditions and the use of a watercraft positioned by propellers is limited to not too unfavorable sea and atmospheric conditions since the propellers, for keeping the ship fixed above a spot on the sea bottom, must always run even in the case of weak outside forces.

It has been found, experimentally, that perfect positioning of a watercraft above a well is not only impossible but is not most suitable for drilling, since this operation may also be carried out very well with the watercraft shifted with respect to the vertical through the well, provided it occurs within the limits of an outer circle corresponding to the largest permissible inclination of the mud return pipe, or "riser". On the other hand when there are strong underwater currents, keeping the watercraft vertically above the well will involve a deformation of the riser in its median part, since even the strong pulls exerted by a stretcher on said riser are not sufficient to keep said riser in a rectilinear aspect. This causes the material constituting the riser to be strongly stretched so that it undergoes fatigue phenomena, and, because of the strong friction of the drilling rods within said deformed riser, there is a quick deterioration of said elements especially in the zone near the ball joint connection with the well. In this latter case it is therefore necessary to shift the watercraft with respect to the vertical through the well to such a position that the riser does not buckle because of said underwater currents.

The present invention aims to eliminate said drawbacks with an improved method by means of which the watercraft is kept so that it is not always vertically above the well but within an outer circle corresponding to the largest permissible inclination of the riser, said method being characterized in that the weak forces which effect a small shifting of the watercraft within said circle with respect to the vertical through the well and therefore a small riser inclination, are compensated only by a system of anchors, whereas the strong forces effecting a large shifting of the watercraft and therefore impermissible riser inclinations are compensated by the combined action of said system of anchors with vertical propellers.

According to the method of the present invention, use is made of anchors which are located on the sea bottom at a determined distance from the ship and are connected thereto by cables and chains, which allow the ship limited shifting movement and exert pull forces towards the centre of the anchoring system and also vertical bladed cycloidal propellers arranged both at the prow and the stern of the ship, which give the direction and the intensity of the required thrust by orientation of the blades effected by lever systems and a control rod.

According to the method of the invention, use is also made of instruments for detecting the values of such quantities as ship position, prow orientation, mud pipe or riser angle, pull at the anchoring cables, outside forces and underwater currents, number and indication of the running motors for each propeller and their speed, propeller thrust and its direction.

A computer receives then said values and processes them, according to the invention, so that the propellers are not in use if the resultant of the outside forces or the riser inclination does not exceed a certain value, the ship being in this way positioned within the bounds of a determined inner circle, where the outside forces react only with the pull exerted by the cables of the anchoring system; if, on the contrary, the resultant of the outside forces or the riser inclination is higher than a certain value, the computer determines the thrust, with direction, of the propellers in order that they may assist, without contrast, the anchoring system and the ship may be positioned and kept, through the pull of the cables and anchors and the thrust of the propellers, on determined spots of a ring comprised between said inner circle, where only the anchoring system acts, and said outer circle.

The invention is now illustrated in detail with reference to the accompanying drawings showing a preferred form of apparatus given only by way of example, since many technical or structural variants may be made within the scope of the present invention.

FIG. 1 shows diagrammatically in side elevation the drilling system making use of the method of the present invention;

FIG. 2 shows the limit circles and angles of the watercraft shift and of the riser angle according to the invention;

Figure 4:
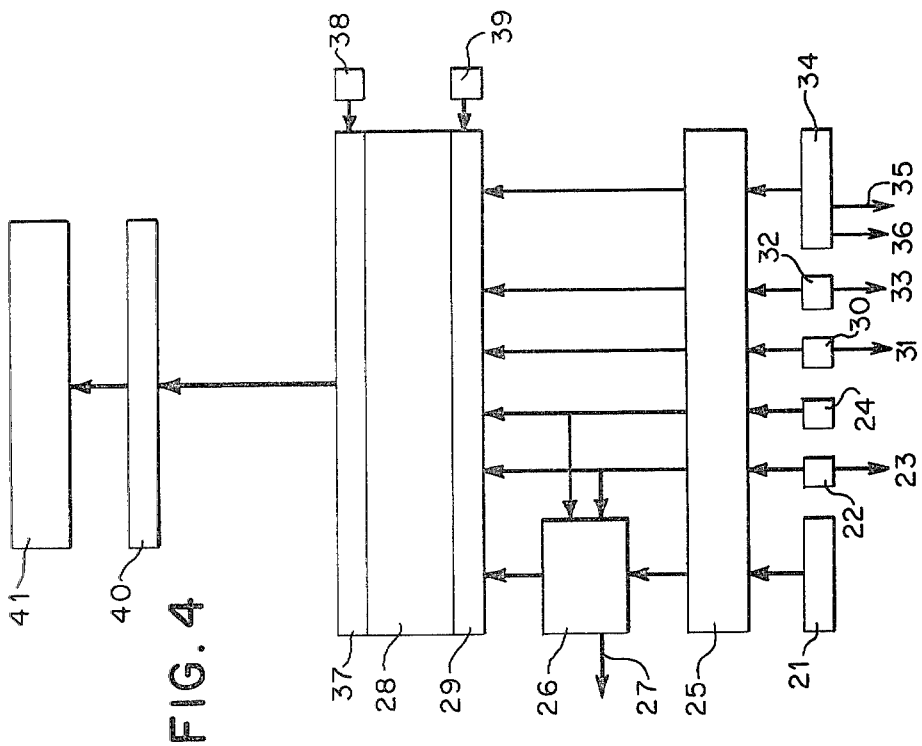
FIG. 3 shows diagrammatically the ship positioning forces as a function of the ship is vertical shift from the well and FIG. 4 shows, in block diagram, the data processing used for positioning the ship according to the method of the present invention.

Referring to the drawings, 1 shows a drilling ship, floating on the surface of the sea 2 and anchored to the bottom 3 by means of a system of cables or chains 6 and 7 connected with anchors 17. Because of the outside forces, the ship, provided with motors and prow propellers 4 and stern propellers 5 having vertical blades, shifts in the direction of the outside forces resultant according to its sense, into a position in which cables 6 and 7, giving the ship a horizontal traction, tend to react with the possible outside forces, configuring mutual different curves.

To the blow-out preventing device 8 of well 9 one connects ball joint 10 of mud return pipe or "riser" 11.

Mud pipe 11, connected with the ship by means of slide joint 12, located on the vertical of drilling tower 13, may therefore, provided ball joint 10 allows its swinging on preventing systems, describe on the ball joint the angle γ, between its longitudinal and vertical direction.

When the ship shifts, due to the outside forces, the line connecting the slide joint with the ball joint, and the vertical on the ball joint form the shifting angle $\alpha$.

An acoustical system signalling the ship shift consists of a sender 14, located on the preventing system, sending ultrasonic wave to three hydrophones 15 located, on longitudinal and transverse directions, on the ship bottom.

The difference in the arrival times of the waves to the hydrophones is proportional to the coordinates of the shift s of the ship from the vertical through the well.

With the mud return pipe or riser, near the ball joint, one connects further an apparatus 16 detecting the angle $\gamma$ of inclination of the riser with respect to the vertical on the ball joint, said apparatus sending the signals to one of the three hydrophones 15.

The sending of signals of apparatus 16 to one of the three hydrophones may replace the system for detecting the shifting of the ship from the well, from sender 14 and from the three hydrophones 15, either in case of break-down of the three hydrophones system or because it is of interest to follow solely the behaviour of the $\gamma$-angle of the riser.

FIG. 2 shows the largest angle $\alpha$ corresponds to a shift s of the ship on sea surface 2, which has to be understood as the radius of max outer circle 18 within which the ship may shift on sea surface 2 without the occurrence of said phenomena. Said circle 18 comprises further the zone within which the ship is free to shift when, due to strong sea currents and outside forces, the positioning system depends only on the indication of the riser inclination without respect to the vertical.

If there are, on the contrary, only outside forces without underwater currents, the ship is positioned only within inner circle 19 having radius $s_1$, inside circle 18, where the action of the outside forces is compensated only by the anchoring system. Within ring 20 the ship shifts under the action of outside forces which are compensated by the anchoring system assisted by the thrust of the propellers.

Figure 3:
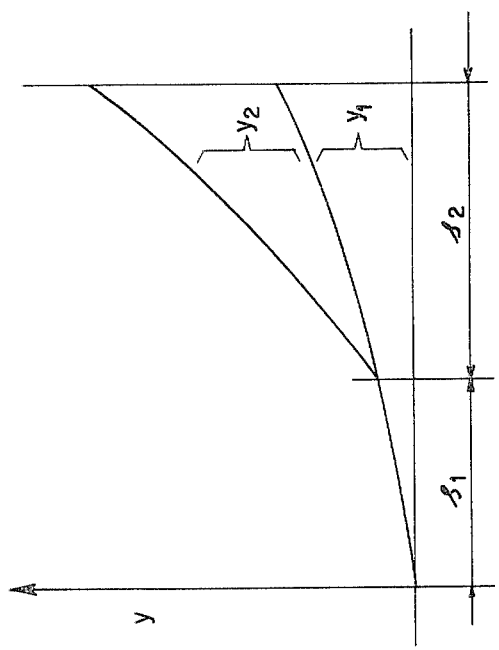

The diagram of FIG. 3 shows in ordinates, against each $y_1$-value of the reaction to the outside forces detected in the position of the ship, the $y_1$-value of the resultant of the pulls exerted by the cables of the anchoring system on the ship, and the $y_2$-value of the reaction given by the propellers, whereas in ascissae it shows the radius $s_1$ of a circle on which the ship, for outside forces having a small intensity, is assisted only by the anchoring system, and the basis $s_2$ of said ring, on which the ship, for outside forces having a high intensity, is assisted both by the anchoring system and the propellers.

FIG. 4 is a block diagram of the processing of the data given by the different instruments for detecting the thrust, in direction and sense, to be given to the propellers in order to position the ship within said limit circle as a function of the value of the resultant of the outside forces or of the amplitude of the riser inclination with respect to the vertical.

In said diagram, 21 shows the accoustical system consisting of an ultrasonic sender, located on the drilling well on the sea bottom, and of three hydrophones located on the ship bottom and arranged according to two directions.

22 indicates a gyrocompass giving the ship direction detected on screen 23. Device 24, near ball joint 10 of riser 11, detects the angle $\gamma$ of the riser.

The signals emitted by said devices are sent, through a signal converter 25, to a calculating unit 26 processing the same in order to emit a signal detecting the ship position. Said signal, detected too on a screen 27, is sent to computer 23 after adjustment in 29.

The signals of gyrocompass 22, indicating the direction of the ship's position, are also further introduced directly into the computer together with the signals of the riser angle given by device 24, in order to be processed together with the data of the further detecting apparatus in order to obtain the values of the required stresses so that the ship, in case of break-down of the ultrasonic system for detecting the ship's position or in case of strong underwater currents, may be positioned in a determined position within the circle having radius $s_{max}$ of FIG. 2 as a function only of riser angle.

Into computer 28 one also introduces the data relating to the underwater currents detected by the apparatus 30, shown on screen 31, and the pulls exerted by anchoring system 32 and shown on screen 33.

The outside forces, which are detected by apparatus 34 are introduced into computer 28 with their characteristics, relate to the direction, sense and speed of the winds, shown too on screen 35, the direction, sense and speed of the wind gusts appearing on screen 36, the horizontal component of the wave motion, and the intensity, direction and intensity of the propellers' thrust.

Computer 28 receives further from each propeller the motor state (number, speed and so on) and the position of the propeller blades.

Finally computor 28, after matching of the signals in converter 40, sends to the group of motors and propellers 41 the different signals resulting from elaborations and calculations for determining the thrust and its direction to be applied to the ship propellers.

From the preceding specification it will be appreciated therefore, that the invention relates to a method according to which ship 1 is kept positioned within an outer circle having radius $s_{max}$, the ship shifts within an inner circle of radius $s_1$ being compensated only by the anchoring system, whereas the ship shifts within the ring 20 defined by said circles are compensated by the combined action of said anchoring system with a system of propellers.

What we claim is:

1. A method of positioning a drilling ship in drilling position above a deep-sea well, comprising the steps of:

coupling the ship to a plurality of anchors secured to the sea floor for confining movement of the ship generally to a first generally circular area on the surface of the sea, the perimeter of said first circular area being defined by the outer limit of movement of the ship when acted upon by external forces no greater than a first predetermined maximum;

monitoring the position of the ship and the external forces tending to change its position, and securing values for said external forces;

introducing the values for said external forces into a computer which controls operating status of a plurality of adjustable propellers on the ship, and activating propellers on the ship essentially only when the external forces acting on the ship tend to move the ship beyond the first generally circular area for confining movement of the ship generally to a second generally circular area having a greater area than said first generally circular area, such that when the external forces acting on the ship tend to change the ship's position to no greater an extent than the perimeter of the first generally circular area, the ship is confined to movement generally within said first area essentially only by the confining action of the anchors, but when the external forces tend to move the ship beyond the perimeter of the first generally circular area, the propellers are activated to cooperate with the anchors to confine movement of the ship generally within the perimeter of the second generally circular area.

2. A method according to claim 1, wherein a riser extends between the drilling ship and the well, the perimeter of the second generally circular area being defined generally by the maximum permissible inclination of the riser when revolved around the vertical passing through the well.

3. A method according to claim 2, wherein said step of monitoring the drilling ship's position is carried out by means of a plurality of hydrophones mounted to the ship longitudinally and transversally thereof and ultrasonic sending means coupled to the riser, the hydrophones adapted to receive ultrasonic waves from the sending means such that the difference in arrival times of the waves is proportional to the lateral shift of the ship.

4. A method according to claim 2, wherein said monitoring step includes detecting the angle of inclination of the riser with respect to the vertical through the well.

5. A method according to claim 4, wherein said step of detecting riser angle of inclination is carried out by detection means coupled to the riser near the well and hydrophone means mounted to the ship.

6. A method according to claim 1, 2 or 3, wherein said step of coupling the ship to the anchors is carried out such that the ship is generally confined within said first generally circular area when acted on by external forces other than underwater currents.

7. A method according to claim 4 or 5, wherein said computer activates the propellers only when the riser inclination angle with respect to the vertical exceeds the angle at which the drilling ship is located at the perimeter of the first generally circular area.

8. A method according to claim 1 or 2, wherein said step of monitoring the ship's position includes detecting wind velocity, underwater current velocity, the forces exerted by the anchors, the orientation of the drilling ship and the speed and direction of thrust of the propellers and introducing values therefor into the computer for determining whether any change in operational status of the propellers is necessary, the computer being adapted to compare said detected values to predetermined values and to determine the thrust and direction that should be applied by the propellers.

* * * * *